United States Patent [19]

Guerin et al.

[11] Patent Number: 4,914,277

[45] Date of Patent: Apr. 3, 1990

[54] ELECTRONIC CONTROL DEVICE FOR AUTOMATIC COOKING, INCLUDING LEARNING FOR HOME ELECTRIC OVEN

[75] Inventors: Jacky Guerin, Mertzwiller; Franck Darigny, Mittelhausbergen; Paul Muller, Reichshoffen, all of France

[73] Assignee: De Dietrich et CIE, S.A., Niederbronn les Bains, France

[21] Appl. No.: 132,587

[22] Filed: Dec. 15, 1987

Related U.S. Application Data

[63] Continuation-in-part of Ser. No. 923,342, Oct. 27, 1986, abandoned.

[51] Int. Cl.[4] .............................................. H05B 1/02
[52] U.S. Cl. .................................. 219/506; 219/492; 364/477; 99/325
[58] Field of Search ......... 219/492, 506, 494, 10.55 B; 99/325; 364/477, 900, 400, 557

[56] References Cited

U.S. PATENT DOCUMENTS

| | | | |
|---|---|---|---|
| 4,255,639 | 3/1981 | Kawabata et al. | 219/10.55 B |
| 4,345,132 | 8/1982 | Tukase et al. | 219/10.55 B |
| 4,356,370 | 10/1982 | Horinouchi | 219/10.55 B |
| 4,580,025 | 4/1986 | Carlson et al. | 219/10.55 B |
| 4,686,356 | 8/1987 | Veda et al. | 219/506 |

Primary Examiner—M. H. Paschall
Attorney, Agent, or Firm—Schwartz & Weinrieb

[57] ABSTRACT

An electronic control for an electric home oven comprises a microprocessor, a panel of function and memory keys used as a keyboard, a working memory of the microprocessor, a learning memory wherein are stored all the parameters of an experimental cooking as it is being executed, except a second modification too close in time to the first, and a permanent memory, outside or not outside the micrprocessor, into which are selectively transferred during a stop in the course of a cooking, on command of the user or automatically, the parameters contained at a given moment in the learning memory.

13 Claims, 15 Drawing Sheets

FIG. 2a
| FUNCTIONS | SYMBOLS | MODES | RESISTORS |
|---|---|---|---|
| F1 |  | DEFROSTING | TURBINE |
| F2 | 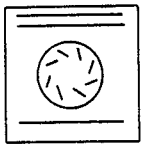 | PASTRY | CHAMBER TOP HEARTH NO. 1+2+BASE+TURBINE |
| F3 | 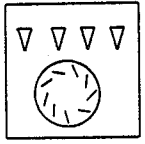 | TURBO-BROIL | CHAMBER TOP NO. 2 +TURBINE |
| F4 | 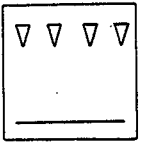 | MEAT | CHAMBER TOP NO. 2 + BASE |
| F5 | 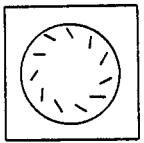 | PULSATING AIR | TURBINE |
| F6 | 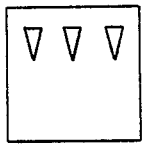 | ECONOMY BROIL | CHAMBER TOP NO. 1 |
| F7 |  | MAXIMUM BROIL | CHAMBER TOP NO. 1+2 |
| F8 |  | PYROLYTIC CLEANING | CHAMBER TOP NO. 1+2+BASE |
| F9 |  | REPAIR | |

FIG. 2b

| REFERENCE CHARACTERS | SYMBOLS | FUNCTIONS |
|---|---|---|
| T1 | °C | TEMPERATURES |
| T2 | (probe) | PROBE |
| T3 | (clock) | INDEPENDENT MINUTE TIMER |
| P1 | (clock) | COOKING TIME |
| P2 | (clock) | END OF COOKING, TIME OF THE DAY |
| P3 | (clock) | CLOCK SETTING |

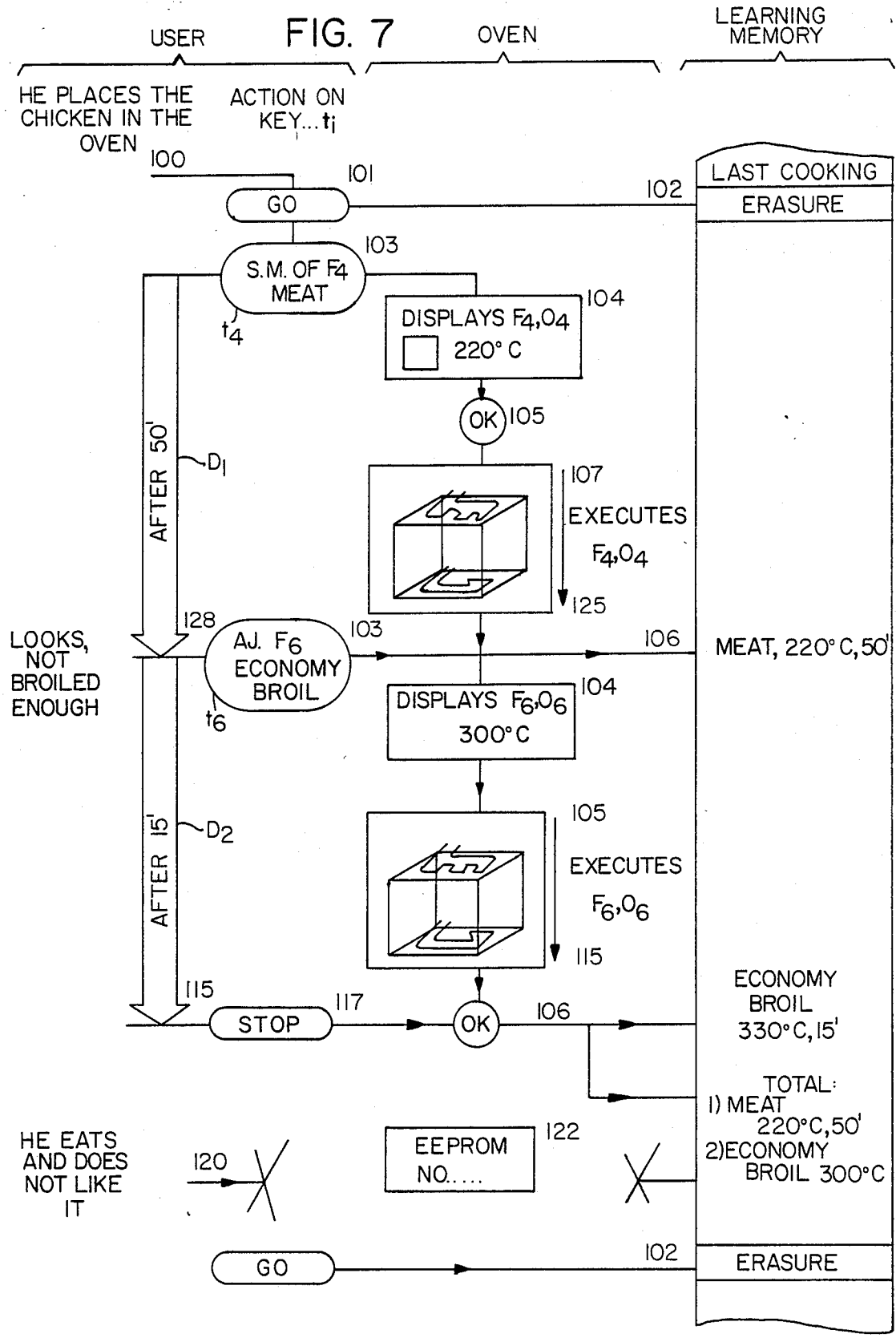

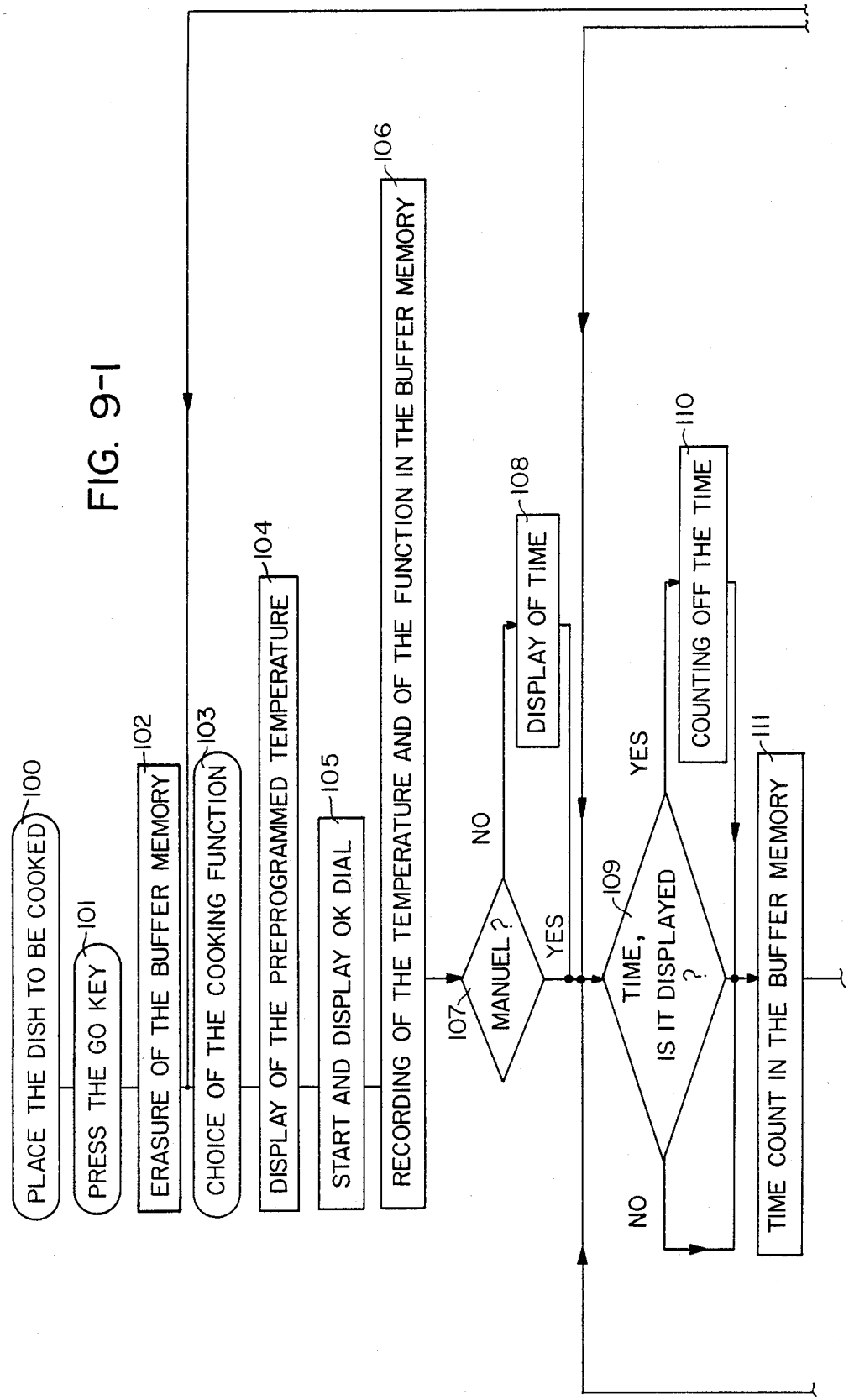

EXAMPLE NO. 4   FIG. 12

ELECTRONIC CONTROL DEVICE FOR AUTOMATIC COOKING, INCLUDING LEARNING FOR HOME ELECTRIC OVEN

STATE OF THE ART

1. Field of Use

The present invention relates to an electronic control device with a selective memory for a home electric oven with heating resistors exhibiting an automatic operation.

2. Description of the State of the Art

The state of the art is illustrated on the one hand by automatically operating ovens of the microwave type, starting with constants and a mathematical principle or cooking equation and, on the other hand, by the earlier oven of applicant with electronic controls on a panel with keys.

They classically comprise a microprocessor and a memory containing a certain number of programmed recipes. The instructions are given, and the parameters are entered into the system by means of a keyboard located near the door.

One thus deals, for example, with ovens of the type described in U.S. Pat. No. 4,568,810, Carmean being the inventor.

This microwave oven possesses a true data processing unit comprising a keyboard, a microprocessor, a memory, and various peripheral instruments.

It comprises in its memory a certain number of programmed recipes and is programmed for cooking a limited selection of foods.

The user enters, through the keyboard, the type of food, the weight or number of basic food items, for example, three potatoes.

The microprocessor calculates the cooking time from a mathematical equation which it possesses in its memory.

The action of the user affects only the cooking time, either increasing or decreasing it.

Besides the small variations possible in the case of preset cooking, this oven presents several cumulative drawbacks. First, the user must, for each modification, remember the previous value. Further, the oven does not memorize what it executes. Finally, the adjustment affects only the cooking time.

While this oven constitutes progress relative to simple defrosting, which is the first function of a microwave oven, it cannot be used for more elaborate dishes, considered gourmet, but only for simple cookings without modification of the various cooking parameters.

This oven thus turns out to be totally unsuitable for cooking gourmet dishes appreciated by the guests.

In the case of the oven described in U.S. Pat. No. 4,580,025—Carlson being the inventor—like in the previous patent, the microprocessor calculates the cooking time according to a preset equation, as a function of the parameters of weight of the food article and of various constants stored in a memory.

The novelty of this oven resides in the fact that in the case of lowering of the performances, a technician can adjust the oven, test its power and, acting on constant values, enter in the memory, adjust, and reestablish a condition of correct operation.

The user does not have the possibility of making these adjustments himself.

An oven of this kind does not offer any possibility of personalizing the recipes. Indeed, the oven reacts or operates according to a predetermined invariable principle, which it possesses in its memory.

Ovens also are known wherein the user can introduce the parameters necessary for the execution of each step of cooking a dish.

The user can modify at any time the parameters of the next step. This is the case of ovens such as that described in U.S. Pat. No. 4,613,739, invention of Paul L. Richard. Cooking can be modified at any time by acting on important parameters such as time, temperature, and power in order to achieve a dish prepared to one's taste. Unfortunately, the modifications of those parameters do not remain in the memory, and the user will be obliged at each repetition of the cooking of the same dish to remember the modifications associated with that dish and to enter them into the unit controlling the operation.

Furthermore, one cannot modify the parameters of the step in progress, except the time.

This possibility of operating the oven according to various modifiable parameters at any time makes it possible to achieve cooking to everybody's taste, which comes very close to a purely manual operation during a given step.

In this manner, the advantage of personalization of each cooking turns out to be small because multiple manipulations are not avoided since one cannot again control the oven directly with all the parameters of an earlier tested cooking.

While the above ovens make possible multiple cookings, that is, having divers steps, it is not possible either to modify each of the parameters of a step in progress or to memorize and automatically execute a cooking tested and approved by the user.

One knows besides cooking chambers capable of automatically executing prerecorded recipes. Those recipes are memorized, for example, on a magnetic card which can be read, then executed. A microwave oven of this type is described in French Patent No., 2,465,390.

This type of a device presents the drawback of being able to execute only those theoretical recipes whose parameters are defined before the beginning of the cooking, without being able to adjust them after the start of the cooking. It thus is impossible to either adjust them to the individual taste of the family or to record the parameters resulting from learning and from the skills of the user.

The main obstacle encountered when attempting to remedy this shortcoming is the disappearance of the data recorded during the local power failures.

Indeed, the solution of an auxiliary battery for supplying power to the RAM memory cannot be used for a panel for the cooking chamber because of its bulk, its cost, and the temperature which the electronic components must withstand because the temperature of the chamber may rise up to 500° C. during the cycle of cleaning by pyrolysis.

There existed, therefore, in the professional circles, a preconceived idea that it was possible to conveniently store for this type of an oven the recipes or the data only on media independent of the control panel, of the type of magnetic fiche or diskette.

Further, it should be noted that no oven of this type is able to memorize the parameters of an experimental cooking of a given dish and to begin cooking with all the parameters of the cooking tested.

Besides, up to now, electronic controls have been employed on all manner of cooking chambers: with natural convection, rotary heat, multifunction, microwaves ... for the simple transmittal of the instructions.

The earlier oven called "conversational" of the applicant also comprises an electronic control panel with keys.

Principally, these keys permit the stop, the start, the selection, the adjustment of the various parameters for executing a cooking, that is, of the cooking mode (meat, pastry ... ), temperature, time, optionally end of cooking, optionally cleaning.

These controls do not make possible to automatically execute the cooking parameters or recipes tested beforehand and recorded. This would be, however, advantageous for the housekeeper who often cooks the same meals, to suit the taste of the family and for a constant number of persons, sparing her the need to systematically redo all the manipulations of key selection in order to reproduce her culinary skills.

SUMMARY OF THE INVENTION

The present invention relates to an automatic, electric home oven with a memory enabling one to modify the cooking parameters at any time, to execute and modify the recipes resulting from cookings tested and entered into the memory, and to memorize a cooking tested by the user.

This electronic control device of an electric home oven according to the present invention has the objective of eliminating the various above-mentioned drawbacks by providing an electronic control device for an electric home oven, characterized by that it comprises:

a learning process, during which the cooking chamber learns the cooking parameters of a given dish, an intermediate selective memorization of the previously learned parameters, a complete memorization of the previously learned parameters, a re-execution process of said parameters.

Moreover, the cooking parameters can be modified or adjusted and taken into account at any time during the cooking, in order to account for the taste, the appreciation, the skills of the user.

In order to carry out this process, applicant thought to employ, in combination with its chamber electronic control device, a memory of the EEPROM type, which already is being used in more remote areas of technology (army, data processing).

This combination, surprisingly, has made it possible to solve at the same time two problems which existed: that of the disappearance of data in the case of power failure and that of the automatic re-execution of cookings tested by the user himself.

The method and the device according to the invention thus allow the user to "retain" his knowhow and to re-execute it faithfully each time he must prepare the same meal for the same number of guests.

The present invention relates to a method and a device for controlling electronically a cooking chamber for the purpose of automatically and exactly re-executing a recipe tested and approved beforehand by the user.

The electronic control device according to the present invention makes it possible to provide a complete automatic and intelligent oven capable of learning what the user has once shown to it by executing cooking to his taste, also capable of re-executing cookings tested beforehand, called RECIPES, and to retain the modifications of those pretested recipes derived from the imagination of the user or of multiple and personalized experiments with the traditional recipes recorded beforehand.

Furthermore, each parameter of each recipe can be individually adjusted by the user without going through a calculation method.

One of the great advantages of the invention lies in the possibility of its adaptability to all manner of classic electric home ovens, catalytic or pyrolytic.

Another advantage of the invention consists in that the user is not required to proceed with the recording of a cooking tested immediately at the end of that cooking. On the contrary, the user has at his or her disposal all the time necessary for eating and evaluating the dish because the parameters of the experimental cooking remain in the learning buffer or memory as long as the GO key is not activated, that is, so long as a new cooking is not taking place.

DESCRIPTION OF THE DRAWINGS

The technical characteristics and other advantages of the invention will appear from the description which is provided with reference to the accompanying drawings, wherein:

FIG. 2a is a schematic view of the symbols correlating the functions with the keys designated F1 to F9.

FIG. 2b is a schematic view of the symbols correlating the functions with the keys designated T1 to T3 and P1 to P3;

FIG. 3 is a composite schematic view showing the control panel and, correlated therewith, the functional schematic diagram of the control unit, and the cooking chamber with the principal cooking parts or elements showing through.

FIG. 7 is a chart showing the correlation between the instructions given by the operator, the control of the parts, and the instructions at the level of the microprocessor in the case of cooking a chicken.

FIG. 14 is a block diagram illustrating the automatic loading into the permanent memory during a stop in the course of cooking.

DESCRIPTION OF THE PREFERRED MODE

The cooking electronic control device is applicable to the classic ovens with electrical resistors but can also be used with ovens known as microwave.

Figure 1:
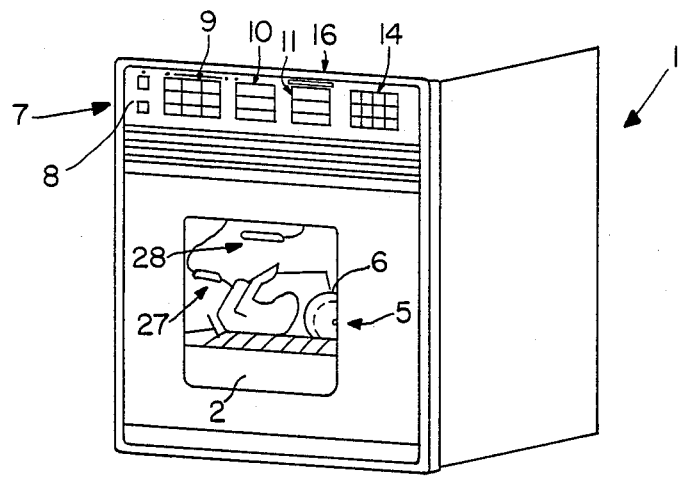
FIG. 1 is a general schematic perspective view of the assembly of an oven comprising the electronic control device according to the invention.
Figure 2:
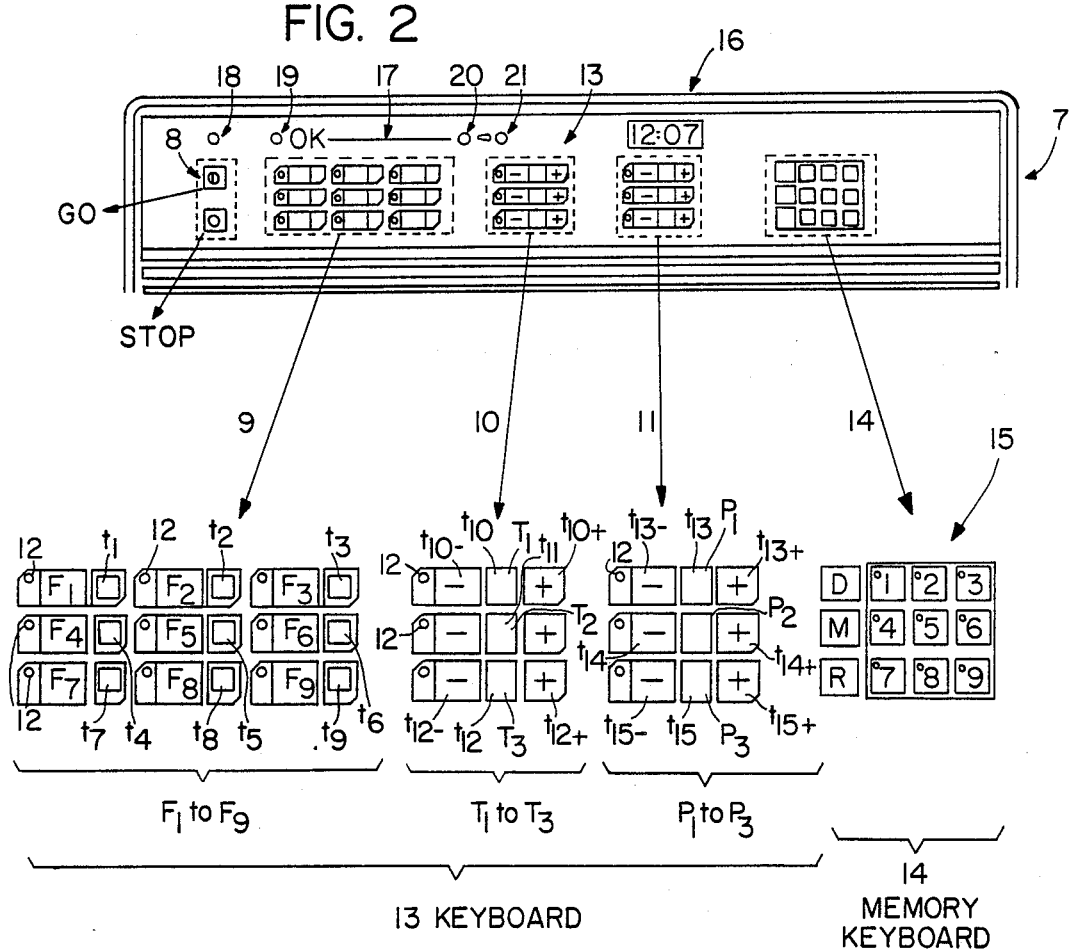
FIG. 2 is a detailed view of the control panel with an "enlarged" reproduction of the functional blocks.
Figure 3:
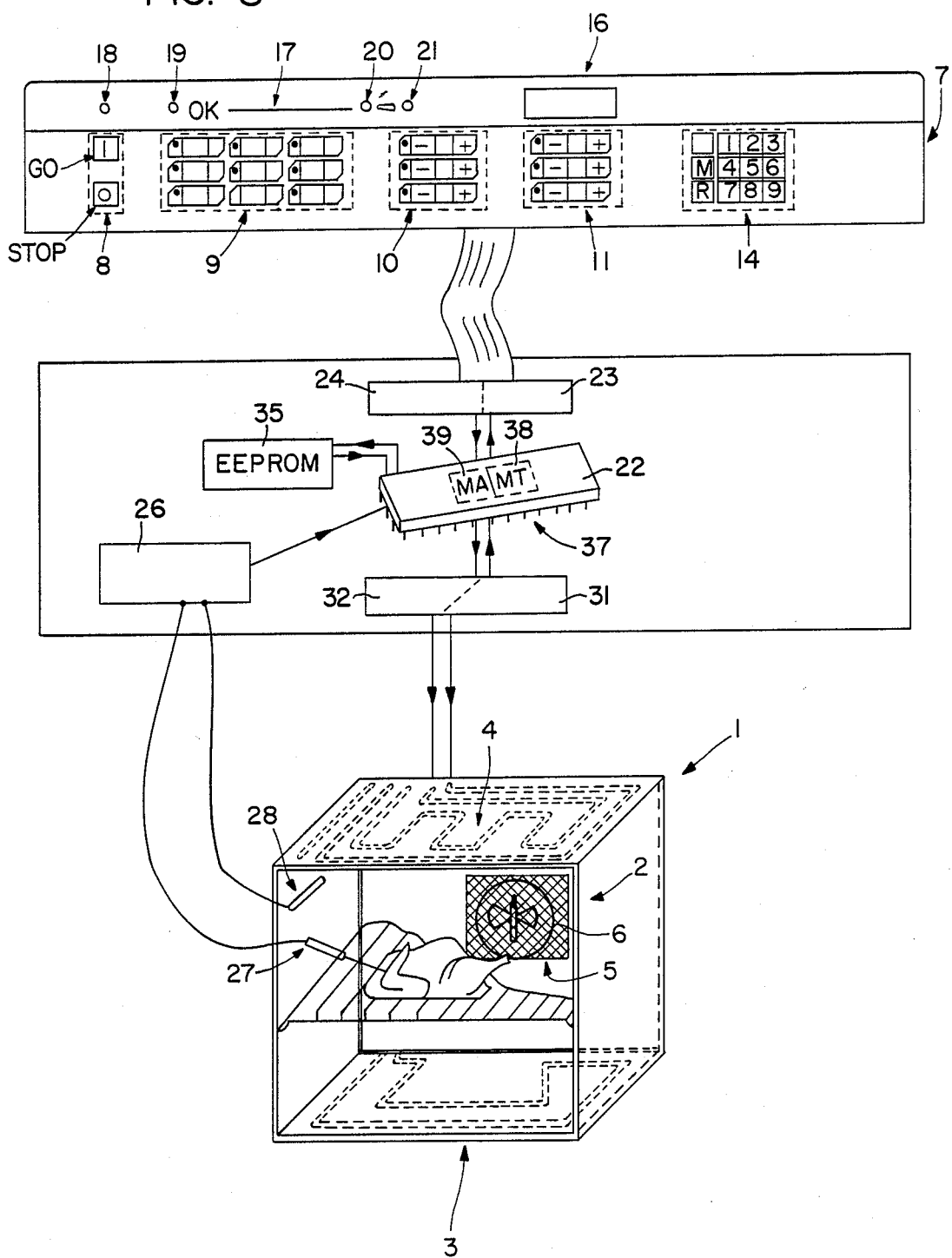

A complete classic oven 1 will be described hereafter, comprising a muffle or cooking chamber 2, a base or lower resistor 3, a double chamber top resistor 4, allowing the realization of economy broil functions with one resistor and of maximum broil with both resistors used simultaneously, as well as a heating fan 5 equipped with a heating resistor 6 permitting pulsating hot air to be sent into the cooking chamber 2 (FIGS. 1, 2, and 3).

This oven comprises a control panel 7 equipped with instruction keys designated "ti", with light dials attached thereto and other keys described below serving as a keyboard for a data processing unit which controls the general operation of the oven.

Details of the ti keys will be given below.

On this panel, the ti keys, for example, of the flexible pouch squeezing type, are arranged into several functional blocks.

One can thus recognize a stop/go functional block 8 comprising a GO key and a STOP key, a block of cooking modes 9 comprising nine keys designated t1 to t9, a block of cooking levels 10 with three keys t10 to t12, and a time block 11 of duration, of time, and of hour of the day, with three keys t13 to t15.

The majority of the keys are equipped with an indicator of operation in the form of a light dial such as 12, providing information on their condition, in service or out of service.

The control panel serves as keyboard 13. It groups the instruction keys ti and is completed by a functional block 14, called memory block, serving as the memory keyboard, and comprising a block 15 of numbered keys for the selection of memory position and operation keys, comprising an M key for entering into memory, and a memory recall key R, as well as a key of tens D. The numerical block 15 comprises nine keys numbered from 1 to 9, making possible the selection with the key of tens D up to eighteen memory positions.

The panel also comprises a display 16, for example, of the type with electroluminescent characters of seven segments. It also comprises in its upper part various associated functions such as a luminous linear scale 17 indicating the temperature within the cooking chamber as well as a general operation indicator 18, an indicator 19 of the operation of the heating elements shown by the letters OK, and two indicators 20 and 21 of door locking.

The commands are given by acting on the keys of the control panel and displayed on the display module 16, which shows to the user together with dials 12, the functions selected, the operations in progress, and the recipes used.

For reasons of clarity, the various functions, each corresponding to one of the keys of the control panel represented by the letter "t" followed by a number, will be explained in detail below.

The functions corresponding to the cooking modes are designated by the letter "F", followed by a number, thus "Fi", and are controlled by acting on the keys from t1 to t9. One thus recognizes:

t1/F1=DEFROSTING
t2/F2=PASTRY
t3/F3=TURBO-BROIL
t4/F4=MEAT
t5/F5=PULSATING AIR
t6/F6=ECONOMY BROIL
t7/F7=MAXIMUM BROIL
t8/F8=PYROLYTIC CLEANING
t9/F9=REPAIR

The ninth key is reserved exclusively for the repairman for repair or maintenance operations.

Functions having adjustable values follow next.

The functions corresponding to the temperature are designated T and are controlled by acting on the keys from t10 to t12. One thus recognizes:

t10/T1=Cooking temperature
t11/T2=Probe temperature
t12/T3=Independent timer.

The functions corresponding to the time are designated P and are controlled by the keys from t13 to t15. One thus recognizes:

t13/P1=Cooking time
t14/P2=End of cooking
t15/P3=Time of the day adjustment (clock).

On each side of the keys from t10 to t15 of these last two function series are placed the associated keys for the adjustment of the parameters referred to as ti+ and ti−, corresponding to the increase or decrease of the values.

Each one of the temperature values is modifiable in steps of discrete values of five degrees Celsius by each action on the + or − key associated with the center key for the function.

Each one of the time values is adjustable in steps of discrete values of one minute by each action on the + or − key associated with the center key for the function.

An increase variation on the t10 key will be written t10 +. It corresponds to an action on the key represented by + of the function T1. It constitutes the instruction for the control to increase the temperature by jumps of 5° C.

Having described the general elements of the oven, there will now be described parts, elements, and purely electronic components forming the electronic control device of the invention.

According to the embodiment given as an example in FIGS. 1 through 4, the electronic control device is controlled by a microprocessor 22 of the type MOTOROLA MC 6805 U3.

The commands are entered into the system by acting on the keys of the control panel 7. The dials 12 associated with each key as well as the display provide information on the functions in service and thus on the operations underway and the progress of the recipes used.

The various parts and elements of operation as well as the cooking resistors are multiplexed by the microprocessor 22.

The visual representation of the commands is transmitted to the control panel 7 by the display drivers 23 and 24 and an exit extension 25 in a known manner.

The electronic control device according to the invention comprises in addition an analog/digital converter 26 with a simple slope which makes possible entering into the microprocessor 22 the data from external sensors, for example, a meat probe or sensor 27 of the type inserted into the foods, a cooking chamber temperature sensor, called oven probe, 28, and a reference probe or sensor 29, which permits disregarding the drift of the electronic components.

The electronic control device according to the invention also comprises:

a relay-amplifier or amplifying relay device 30, which has the function of connecting the exit terminals of the microprocessor 22 to the oven controls;

a relay-amplifier 31, which has the function of connecting the exit terminals of the microprocessor 22 to the controls of the door lock, of the pulsating heat turbine, and of the fan;

a door safety device 32, which has the function of transmitting to the microprocessor 22 the information on door locking during the pyrolysis operation.

Figure 4:
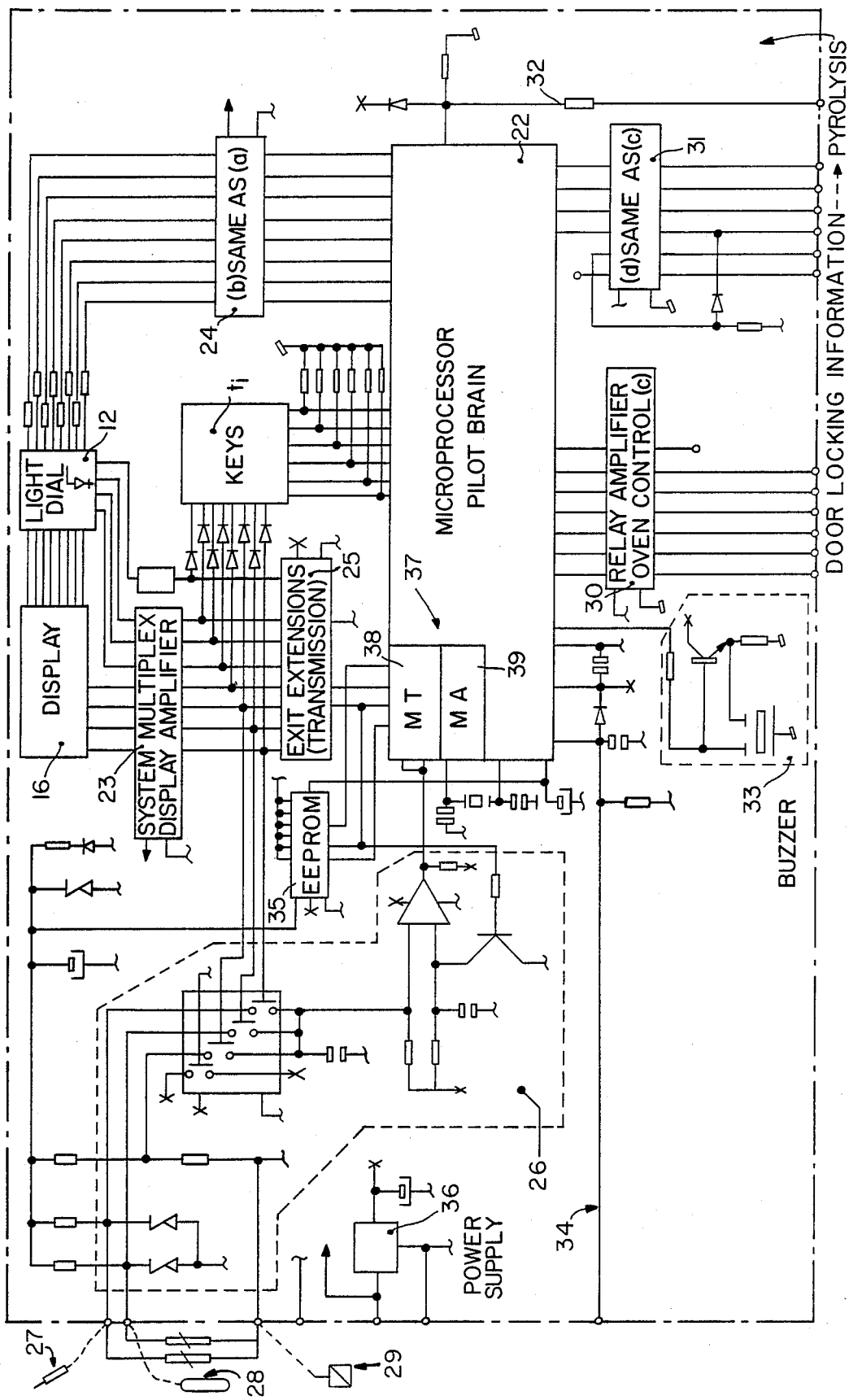
FIG. 4 is a general functional schematic diagram of the oven control.

The electronic control device according to the invention also comprises:

a buzzer 33 the sound timing signal circuit or clock 34 an EEPROM memory 35 an electric power supply 36 an assembly of classic wiring components seen in FIG. 4.

The EEPROM memory 35, called permanent memory, for example, outside the microprocessor, is used for its ability to preserve the parameters of the recorded recipes, even if a local power failure occurs.

Its capacity permits the recording of several traditional recipes, for example, amounting to eighteen, which can be used as such or can be modified according to one's taste, or can be erased and replaced by other recipes corresponding to tested and approved cookings.

In order for the memorization to be selective, the inventors have provided for the use of several memories.

With the permanent EEPROM memory, for example, outside the microprocessor, there is associated a live, erasable, internal memory 37 of the RAM type, one portion whereof is used as the work memory MT, designated 38, wherein the working parameters are stored, and another portion called learning memory or buffer MA, designated 39, wherein are stored all the parameters of an experimental cooking as its execution progresses, and remain therein until the next cooking.

The totality of these characteristics constitutes one of the novel principles of the invention.

GENERAL OPERATION

Figure 6:
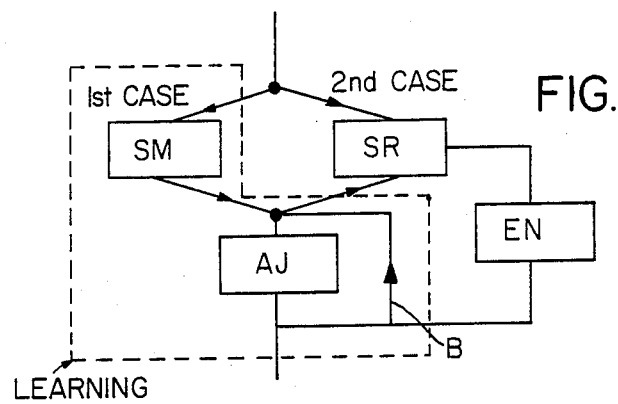
FIG. 6 is a simplified schematic block diagram of the oven operation.
Figure 5:
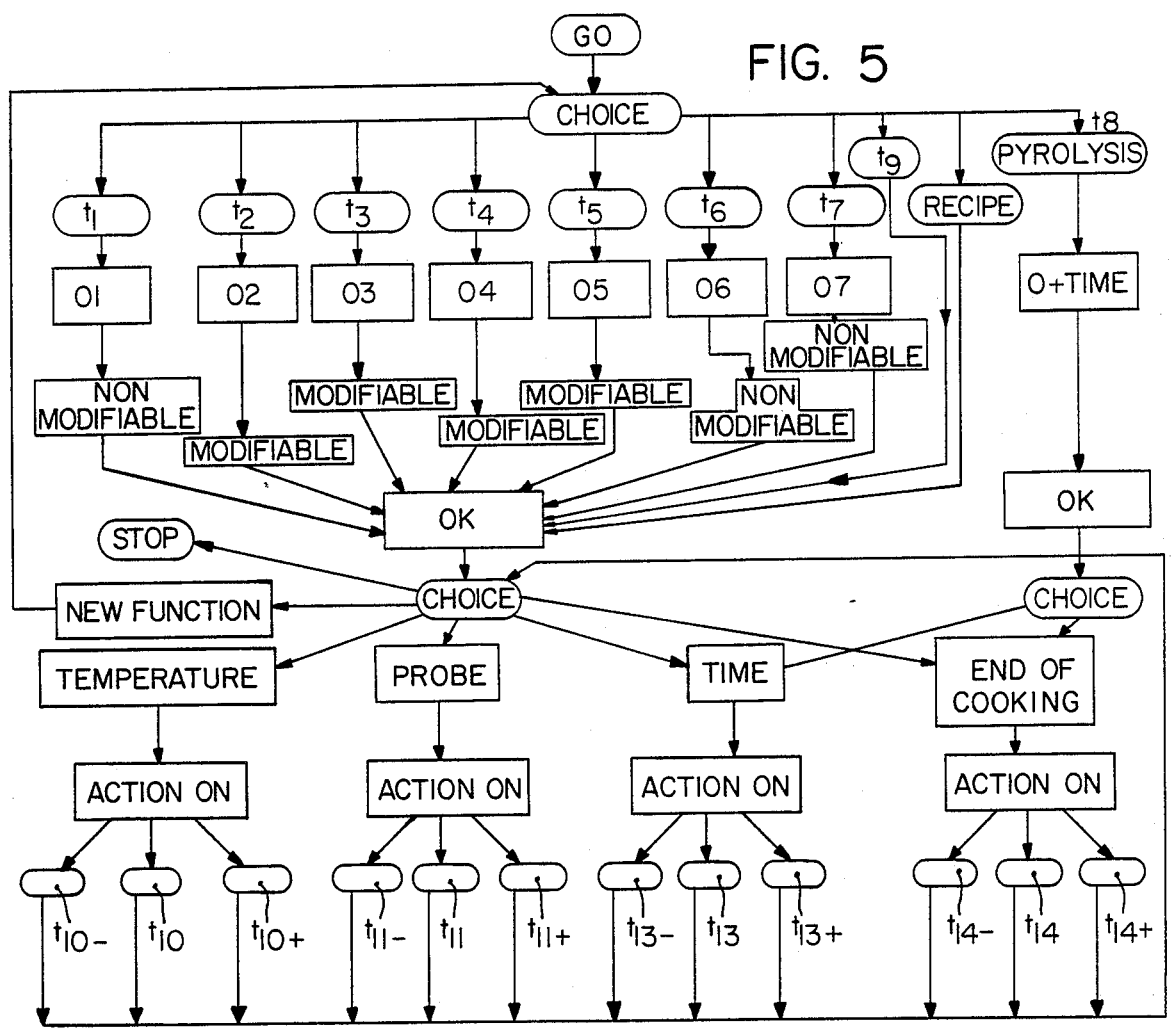
FIG. 5 is a general block diagram of the oven operation.

The electronic control device operates according to the general block diagram shown in FIGS. 5 and 6, which show schematically the various possibilities of the oven comprising said electronic control device.

The following symbols were used for that block diagram:

represents an action carried out by the microprocessor 22;

represents a command action by the user on a control key of the panel;

represents a choice of the user.

It will first be noted in FIG. 5 that, after action on a GO key of the operation block 9, the user can choose between cleaning by pyrolysis and cooking. Cleaning by pyrolysis being known, only cooking will be of interest. The choice having been made for cooking a given dish, two cases are possible, as can be seen in FIG. 6.

FIRST CASE

Learning a cooking.

The user cooks a dish for the first time. He must make a manual selection, designated by SM, of the cooking parameters. To do this, he selects one of the keys (t1 . . . ti . . . t9) corresponding to the functions (F1 . . . Fi . . . F9) (FIG. 5) corresponding to a cooking function such as described above, for example, defrosting, pastry, turbo-broil, meat, pulsating air, economy broil, maximum broil, pyrolytic cleaning, repair. A temperature programmed by the microprocessor is displayed on the display 16. The temperatures selected by the keys corresponding to T1 to T3 and the times selected by the keys corresponding to P1 to P3 can be immediately modified by acting on the associated keys ti+ or ti−, placed on each side of each key.

The choice of the function by acting on the corresponding key starts an automatic operation at a preset temperature $\theta i$ judged the most suitable for that function.

As a non-limiting example, the preset discrete values for the temperatures are as follows: $\theta 1 = 50°$ C., $\theta 2 = 200°$ C., $\theta 3 = 190°$ C., $\theta 4 = 220°$ C., $\theta 5 = 180°$ C., $\theta 6 = 300°$ C., $\theta 7 = 300°$ C.

These values are displayed and are used in the chosen cooking mode without modification or adjustment. They correspond to the typical values close to those used in each cooking mode.

This has the purpose of reaching in the quickest way by manual control the desired temperature parameter, thus making possible a quicker startup of the oven.

The "OK" dial is lit, showing that the cooking elements of the oven are under voltage and operating (FIG. 5). Another choice is presented.

The user has many possibilities at his disposal. He can:

display, adjust, or modify any one of the cooking parameters, by an action represented by AJ, acting on any one of the ti+ or ti− keys or on one of the associated keys provided on the control board, increasing or decreasing the value; for example, but without a limitation, on each side of the t10 to t12 keys for the functions T1 to T3 and t13 to t15 for the functions P1 to P3. These actions (step AJ of FIG. 6) can occur once or several times, and at any time during the progress of the cooking step, if the user judges that cooking is not taking place in an absolutely satisfactory manner.

carry out a double cooking, comprising two consecutive cooking steps, for example, a DEFROSTING function F1, followed by a cooking MEAT function F4. This is represented by the NEW FUNCTION loop with return to the first choice (FIG. 5), Each parameter of the second cooking step can be displayed, adjusted, or modified by one or several actions on the ti keys of the functions Fi and Ti, exactly as for the first step.

The return loop of the second choice corresponds to a new adjustment.

When the cooking is finished, the user presses the STOP key.

The user tastes the dish. It is satisfies his taste, learning is completed and he will be able, if he so decides, to maintain indefinitely the parameters of this cooking which will become, when entered into the EEPROM memory, a recorded cooking, called hereafter a RECIPE.

If the dish is not a success, the user does not transfer the parameters of this cooking into the EEPROM memory. He will carry out further experimental cookings, until the result is satisfactory and learning is completed.

The user can thus select the cookings and retain in the memory position in the EEPROM memory, in the form of a file called register of RECIPES, only those cookings which suit him.

SECOND CASE:

Re-Execution of a recorded Cooking or Recipe

The user wants to reproduce a cooking which he has already tested and recorded in a register corresponding to a memory position in the EEPROM memory; this cooking is called RECIPE.

He selects the number corresponding to the number of the recipe in the above-described register of RECIPES. One deals in fact with the number of the memory selected or memory position for recording this recipe. One deals with the step: recipe selection of the process, represented by SR in FIG. 6 or RECIPE key in FIG. 5.

The microprocessor 22 then displays the parameters recorded in the register selected on the display 16. Acting on the GO key authorizes the oven to re-xecute said parameters.

For a given family, the dish to be cooked will have an essentially constant weight, and the user will be able to be sure, in selecting each time the same RECIPE reference, for example, No. 5 (memory No. 5 of the permanent EEPROM memory), to faithfully reproduce the cooking which was satisfactory to him, all this automatically and without supervision.

If, occassionally, the number of guests and the weight of the dishes to cook are modified, the user can, after selecting the same RECIPE reference, for example, No. 5, modify, for example, the cooking time. If this adaptation is occasional, the register No. 5, or memory position No. 5 of the EEPROM memory retains the initially recorded time parameter, except on contrary command given by the user, as will be seen hereafter. One again encounters here the adjustment step AJ of FIG. 6. This is a particular learning case.

In this second case, the cooking has started by a re-execution step, followed by a particular learning form, with or without memorization of this learning, according to the decision of the user.

THE RECORDING

The recording, which consists in the transfer of the parameters into a given register of the permanent EEMPROM memory (memory position) occurs only on command of the user and at any time, after stopping the oven and before a new cooking.

Loading or writing into the EEPROM memory proceeds in two steps:

(1) Selection of a number in the RECIPES register. When this register is empty, the display indicates NOT OCCUPIED. When this register already contains an earlier recording, the display shows all the parameters of the earlier recording.

(2) Transfer into EEPROM memory 35 of the parameters of the last cooking by means of the M key for entering into memory, seen in FIG. 2.

The oven responds by a beeping sound or audible beep indicating that the recording is well accepted and by three sound signals if the recording could not be made.

The recording is called a RECIPE. Each recording in an occupied memory position erases the earlier RECIPE. The capacity of the register of RECIPES is, for example, eighteen recipes corresponding to eighteen numbers from 1 to 9 and from 11 to 19, with a key of tens represented by D and nine units keys (see FIG. 2), corresponding to the capacity of the memory.

A novelty of the invention is that the memory of this oven is selective.

It is selective because the user can eliminate the cookings which were not satisfactory. It is selective because it does not retain the steps of short duration, which are considered inefficient relative to the total time and frequently represent user's errors.

Conventionally, the oven control will only retain the cooking steps of a duration equal to or greater than five minutes.

During the progress of a learning cooking, the parameters (functions, temperature, time) of the step in progress are retained in the work memory MT, reference number 38. If the user presses one of the keys of the control panel to modify a parameter, this will be called an adjustment, designated AJ; this action produces the transfer of parameters found in the working memory to the learning buffer or memory. Thus, action on any one key loads into the learning memory MA the parameters of the step which precedes that action.

Figures 1, 10:
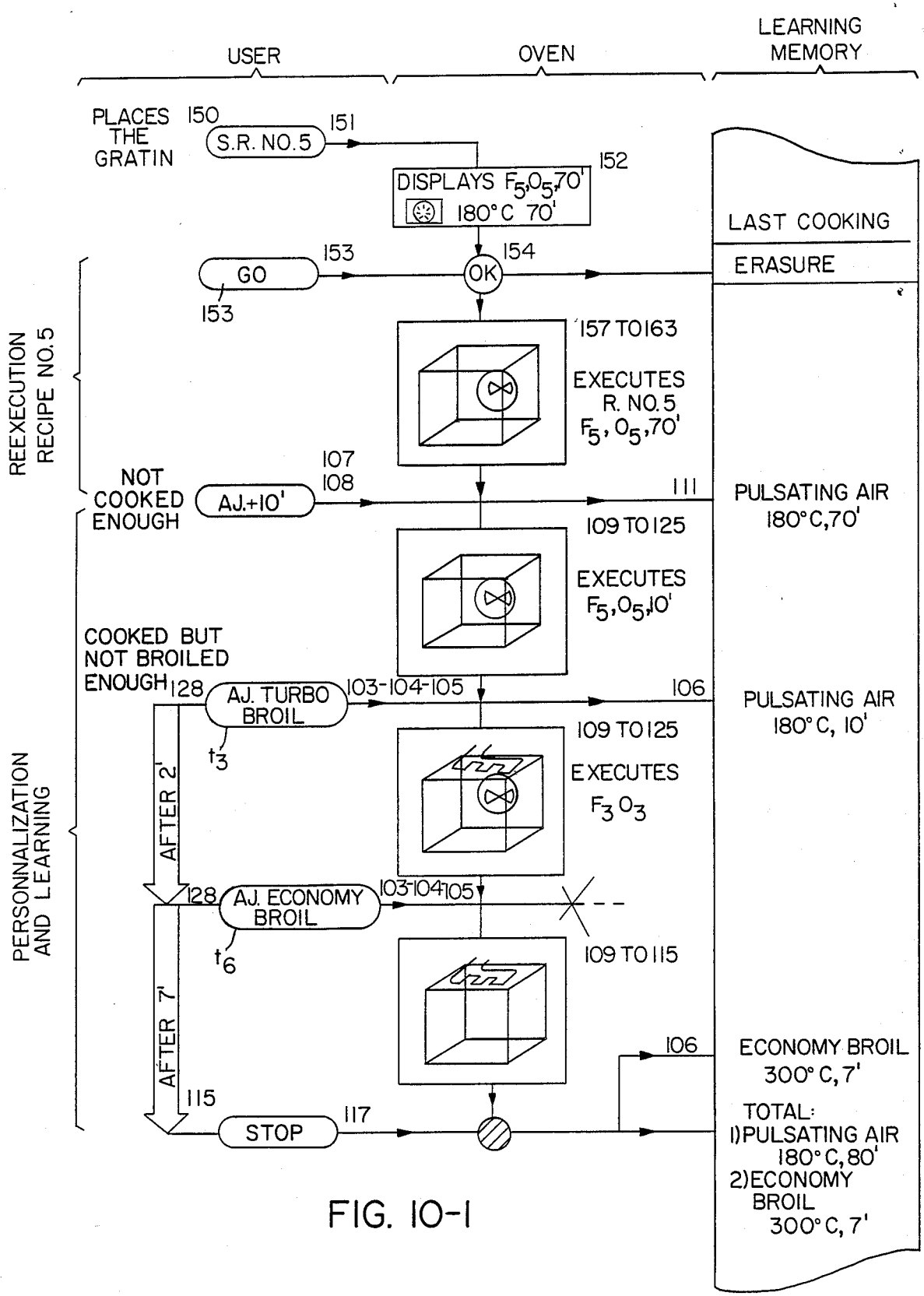
FIG. 10 is a chart analogous to that of FIG. 7 in the case of cooking potatoes au gratin.
Figures 2, 10:
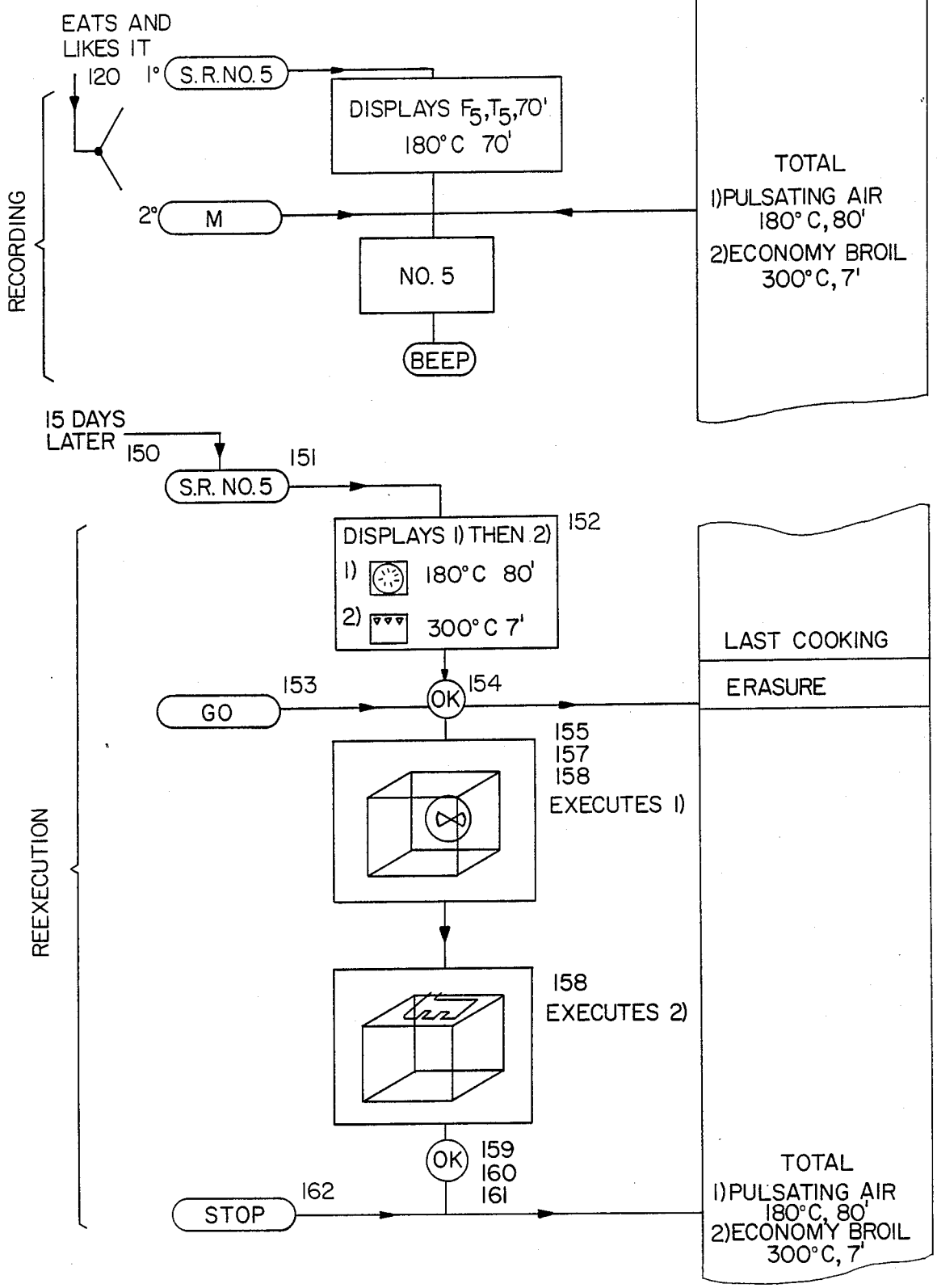
Figure 11:
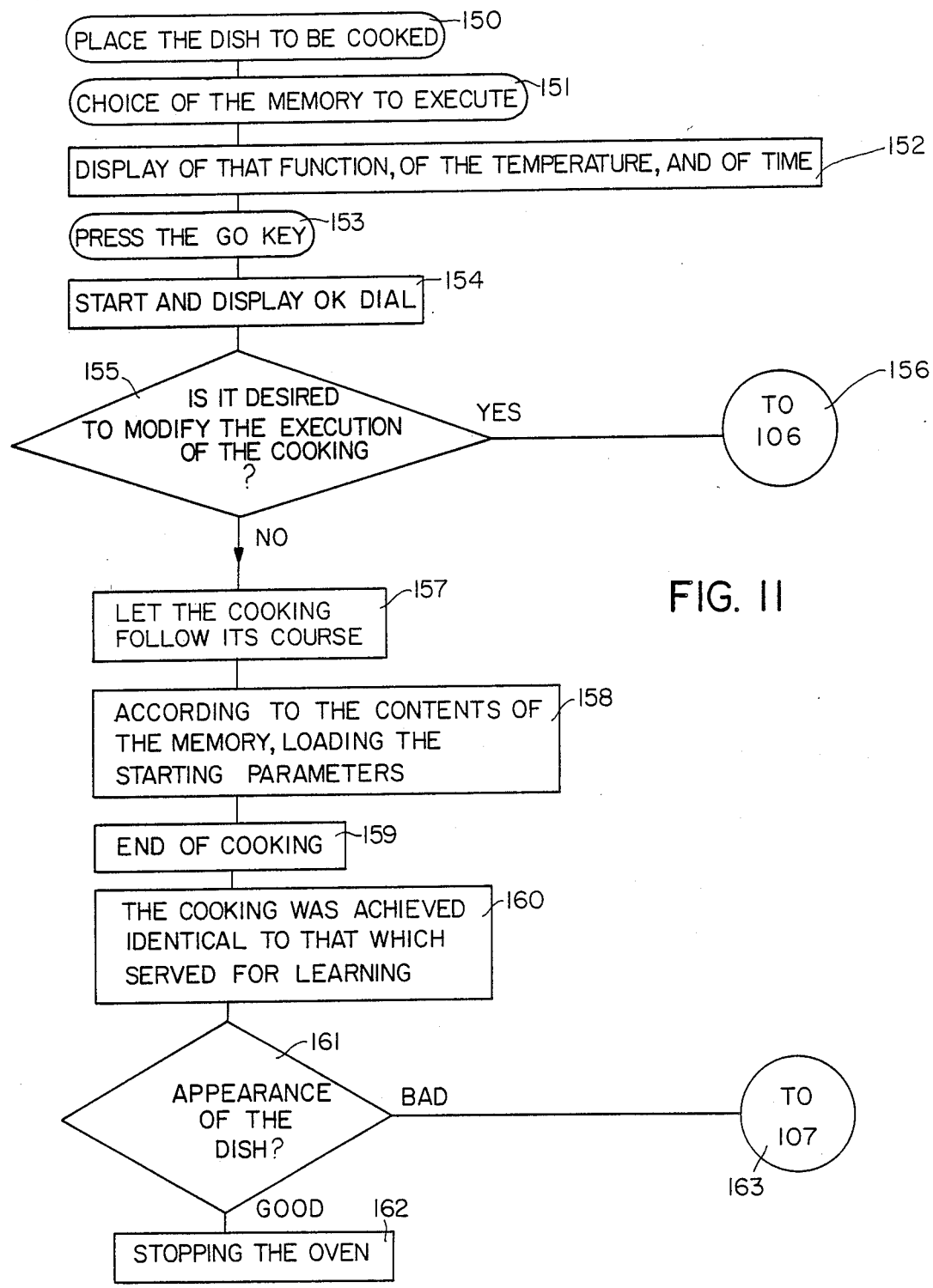
FIG. 11 is the corresponding block diagram.

If a cooking step (time interval between two successive modifications of any desired parameter) is less than a predetermined value, here five minutes, loading into the learning buffer or memory does not take place (see FIG. 11). Everything happens as if the learning memory disregarded those modifications. An action on the STOP key, when an experimental cooking is completed. results in loading into the learning memory the last step of the cooking and also of the final status of the steps, which we have called "TOTAL" in FIGS. 7, 8, 10, and 12.

If two consecutive steps of the same cooking use the same Fi function by means of a ti key for the same temperature, but for different times, the TOTAL of the learning memory shows the same function, the same temperature, and the totasl time (see FIG. 7).

Figure 8:
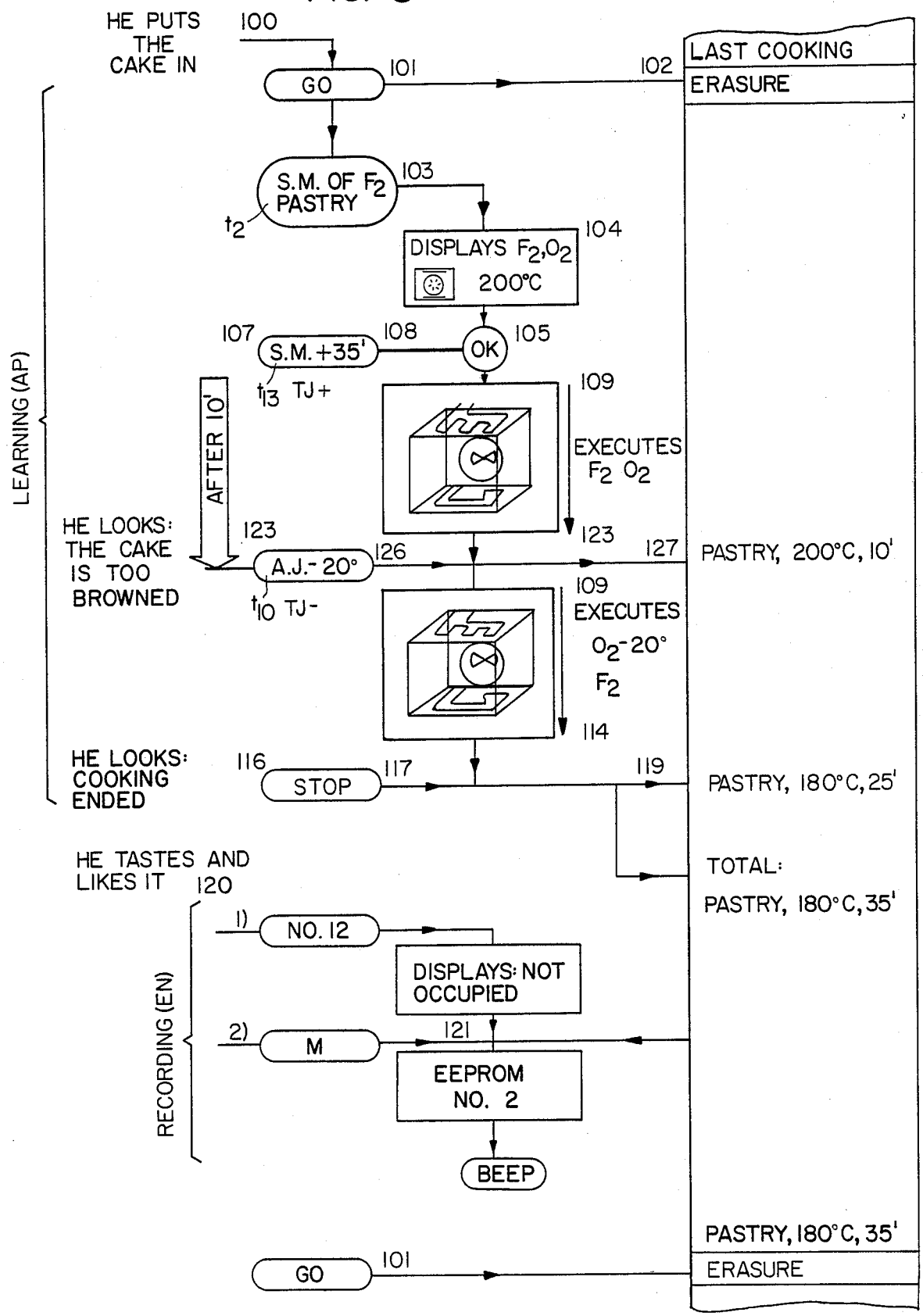
FIG. 8 is a chart analogous to that of FIG. 7 in the case of baking a cake, with subsequent entry into the memory.

If two consecutive steps use the same Fi function through the ti key, but with different temperatures and times, the TOTAL of the learning memory shows the function, one of the two temperatures, and the total time (see FIG. 8).

If two consecutive steps do not use the same function, the TOTAL of the learning memory shows separately, and in order, the parameters characteristic of each step (see, for example, FIG. 10)

The user cannot directly load the leaning memory, nor can he directly introduce parameters therein. He can solely cause an erasure therein by acting the GO key, provided that a cooking is not being executed.

The learning memory, when it is occupied, contains only the parameters of one cooking, this cooking being able to consist of a series of steps. It is an image, step by step, of the real operation of the oven (excluding the errors).

The permanent EEPROM memory, designated 35, plays the role of permanent memory, wherein only the successful learning cookings are retained.

Loading of a RECIPE into the EEPROM memory 35 occurs only on command of the user, and after the required stopping of the oven. The parameters loaded into that memory 35 always are those contained in the TOTAL of the learning memory 39. No error is possible because the learning memory contains only one TOTAL. The user thus cannot directly modify the contents of the permanent EEPROM memory, designated 35.

This permanent EEPROM memory 35 contains only RECIPES, that is, cookings which were satisfactory after being tested.

The erasure of a RECIPE stored in the EEPROM memory is possible only by replacing that RECIPE by another RECIPE.

The EEPROM memory also plays another role.

If a supply power failure occurs during the progress of a cooking, the parameters of the learning memory are automatically transferred into the EEPROM memory until the return of the power, and the interrupted cooking can restart by automatic reloading of the parameters into the learning memory, as will be seen hereafter in more detail, when studying the corresponding block diagram corresponding to this operational feature.

LEARNING

Learning, AP of a culinary dish consists in experimentally cooking that dish. This experimental cooking most often comprises several steps either because of the trial and error of the user or because of the requirements of the culinary dish.

The parameters are determined at the start by actions on the keys of the control panel, called manual selections SM.

The modifications which take place subsequently are the adjustments AJ also produced by the actions on the control keys ti and resulting from trial and error.

When the adjustments AJ are too close in time, it is considered that the cooking step which occurred between two successive adjustments does not affect the final result, and this step is treated as a user's error. It is not taken into account by the learning memory.

In FIG. 6, the return loop B indicates the possiblity of several successive adjustments.

It sometimes is necessary, if the cooking result is not perfect, to start again the learning cooking several times, improving it each time.

The user will load into the EEPROM memory only the final learning cooking, that is, the definitive cooking, which will be a RECIPE.

When the user wants to adapt or personalize a RECIPE from the EEPROM memory, he starts cooking by recalling RECIPE contained in that memory by a register number or memory position (see FIG. 10).

The oven executes the cooking according to the parameters. One deals with the re-execution step, followed by one or several adjustments, step which represents a particular learning case.

Finally, to complete the description, it will be noted that:

the PROBE function (FIG. 5) corresponds to putting in service of the meat probe 27, with an optional elimination of the time and end of cooking, and permits disregarding the weight of the meat. In this case, the time parameter is eliminated and replaced by the probe temperature.

the TIME function (FIG. 5) permits the elimination of the probe. A buzzer warns that it is necessary to disconnect the probe. The time parameter either is determined by the user or is calculated by the microprocessor, which totals the time which has lapsed during a learning phase.

The t13 and t14 keys are used, respectively, for programming the cooking time and the time of the day for the end of cooking (delaying). These controls are classic for an oven.

The oven can be delivered with the positions of the EEPROM memory occupied by RECIPES for the execution of the learning cookings.

Of course, the circuit represented in FIG. 5 is non-limiting. Execution variants due to the evolution of the components or of the oven performances can be considered as technical equivalents.

For example, the mechanical actions on a portion or the totality of the ti keys corresponding to the functions Fi, Ti can be replaced by voice recognition circuits.

The microprocessor-EEPROM memory assembly can also be replaced by a microprocessor with an integral EEPROM memory.

The process and device described herein can be applied to any type of cooking chamber, including microwave ovens and ovens combined with microwaves.

To facilitate the understanding of the invention, the explanations concerning the operation will be completed by the following description of several examples of use, some of which are accompanied by a corresponding block diagram of operation, with reference to FIGS. 7 to 13.

On the charts of the drawings of FIGS. 7, 8, 10, 12, and 13, there are represented the function symbols in the rectangles representing the display, and the schematic diagram of the cooking resistors in the rectangles representing execution.

For reasons of ease of understanding, the action blocks have been numbered starting with 100 for the first block diagram and starting with 150 for the second (FIG. 11), and these reference numbers have been used in the description of the examples, each reference number being preceded by the term block.

In these block diagrams, the steps represented by a rectangle with curved small sides represent the actions of the user, while the steps represented by the rectangles with straight small sides represent the actions of the electronic control of the oven.

EXAMPLE 1

Learning of a cooking not retained

One deals with a learning cooking of a roast chicken, which will not be memorized.

The user wants to cause learning of its new oven, learning described with reference to FIGS. 7 and 9.

He first tries to execute the cooking of a roast and broiled chicken.

He chooses here an operation without delay, without automatic programmed stop, by pressing on a key of function Fi, which calls a preselected temperature $\theta i$. The parameters are displayed, but the user does not program the time and will have to watch the cooking and stop himself the oven.

Having placed the chicken in the oven, block 100, he presses to GO key, block 101, which controls the starting of the oven, then manually selects the function, block 103, by pressing the corresponding key t4, corresponding to the function F4, which is the MEAT cooking mode. The dial of the MEAT function lights up, the display displays 220° C., and the dial of application of voltage to the heating elements lights up.

The user lets the cooking progress, block 107, and after time D1 equal to fifty minutes, blocks 109, 110, 111, he judges that the chicken is cooked just right, block 112, but not sufficiently broiled, blocks 123, 128. He then presses the key t6 corresponding to the function called "ECONOMY BROIL"; he obtains automatically operation in the BROIL mode, and at the preset temperature $\theta 6° = 300°$ C., return to block 103, and after time D2 equal to fifteen minutes, blocks 103 and 115, judges that the chicken is sufficiently broiled. He thus dedcides to stop the oven and presses the stop key called STOP, block 117.

The user then eats the chicken, but he does not find it to his taste. He finds it, for example, too dried up. He thus decides not to keep this cooking as a recipe and does not record it in the EEPROM memory.

Looking at the chart of FIG. 7, one sees that there has been, in the course of cooking, only one adjustment, which is a change of function, moving from the F4 function corresponding to the "MEAT" cooking mode to the F6 function corresponding to the "ECONOMY BROIL" cooking mode.

Action on the t6 key controlling the F6 function automatically causes the transfer into the learning memory MA of the F4, $\theta 4$, and D1 parameters, that is "MEAT", 220° C., 50′ of the cooking step which has preceded this action on the key t6.

Acting on the t6 key, corresponding to the F6 "ECONOMY BROIL" function has also caused lighting up of the dial of the corresponding function such as 12 and displayed the preselected temperature corresponding to ECONOMY BROIL, that is, $\theta = 300°$ C.

Stopping the oven automatically causes entry into the learning memory MA of the parameters of the second cooking step: F6, $\theta 6$, D2.

The learning memory retains the parameters of these two cooking steps until the next action on the GO key or until the next apparatus supply failure or the next failure of the electric power distribution network.

A learning cooking of the dish ROAST CHICKEN has just been described. The result is not satisfactory, blocks 120–122. The user will not transfer this cooking into the memory by acting on the M key for memory loading. He will be able to execute other learning cookings and will only preserve in the definitive memory and in the form of RECIPE that which will have given him satisfaction.

EXAMPLE 2

Learning a retained cooking or recipe

Figures 2, 9:
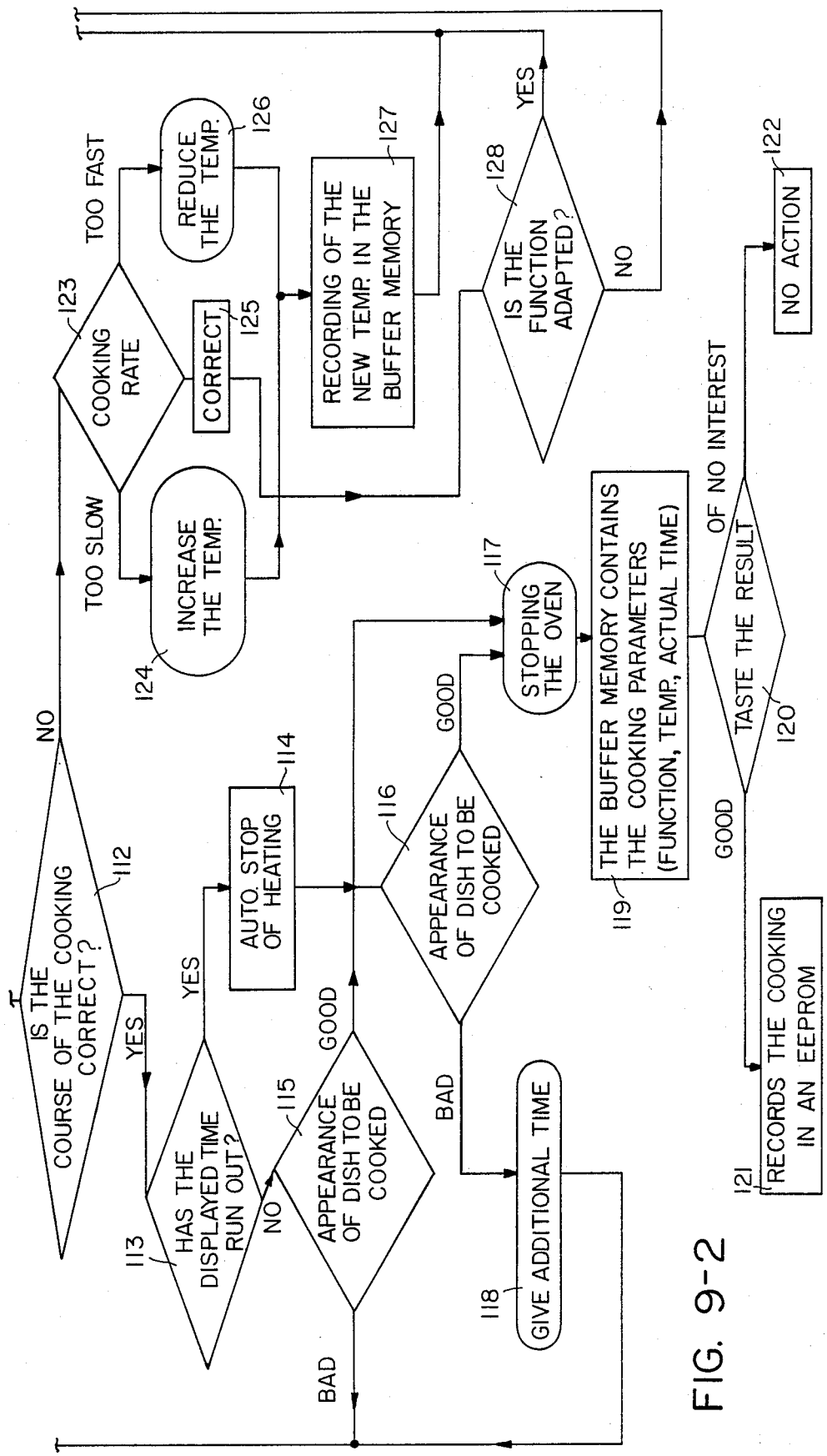
FIG. 9 is a block diagram shared by both examples of FIGS. 7 and 8.

Contrary to the previous example, one deals with an experimental cooking, for example, a cake, of which the user will approve and will decide to retain it in memory (see FIGS. 8 and 9).

He places the cake prepared beforehand in the oven, block 100, presses the GO key, block 101, manually selects, SM, the function F2 corresponding to the "PASTRY" cooking mode by pressing the t2 key, block 103.

The dial OK of application of voltage to the heating elements lights up, block 105. The user chooses to select the time and presses the key t10+ in order to program thirty-five minutes, blocks 107, 108. But, after ten minutes the user realizes that the cake already is too brown on the surface and not cooked enough inside, blocks 112, 113–126. The oven thus is too hot.

He adjusts the temperature by pressing several times or for a longer time the key t10− of temperature decrease, adjacent to t10, to reduce it by 20° C., block 126, that is $\theta 2 - 20°$ C. $= 200°$ C. $- 20°$ C. $= 180°$ C.

Action on this key has automatically transferred into the learning memory MA the parameters of the step which has just taken place: F2, $\theta$, 10′, that is, PASTRY, 200° C., 10′. One has reached the block 127 of the block diagram.

Now, cooking ends with twenty-five minutes remaining of the programming with the new temperature parameter, blocks from 109 to 114 and 116, 117.

At the lapse of that time 35′ the oven stops automatically. The stopping of the oven automatically causes entry of the parameters of the second step: F2, T′1, 25′, that is, PASTRY 180° C., 25′ into the learning memory, which will only take into account the last temperature of 180° C. (judging that the first was incorrect) as well as the total cooking time.

The user eats the cake and finds it a success, block 120. Learning is ended. The user decides to preserve the parameters of this cooking and to retain it in the memory in the form of a RECIPE in the following manner.

With reference to FIG. 8, the recording block 121 is carried out in two stages:

First stage: the selected position designated 12 of the memory is called by pressing the tens key D, then the key No. 2 of the block 15 of the memory keys. This position, if it is unoccupied, displays NOT OCCUPIED. In the contrary case, it displays the parameters which it contains.

Second stage: by action on the M key, the parameters retained in the learning memory MA are loaded into the memory position No. 12 the the EEPROM memory, while erasing the earlier parameters. A beeping sound indicates that the loading is done.

EXAMPLE 3

Learning with adaptation of a retained recipe

One deals with a recipe executed, adapted, personalized, then memorized in the permanent EEPROM memory, which one desires to arrange to one's taste or to adapt to the number of guests.

The user wants to cook potatoes au gratin for five persons (FIGS. 10 and 11).

It is assumed that the oven possesses in its memory in the No. 5 position the prerecorded recipe of a gratin for four persons, which will have to be adapted to five persons.

He places the dish in the oven, bloc 150 (FIG. 11), selects the recipe No. 5, block 151. The oven displays the parameters of the recipe, block 152: F5, 180° C., 70′. He presses GO, block 153, in order to start the cooking.

The recipe is re-executed by the oven in a manner identical to that present in the EEPROM memory, blocks 157 to 159. But at the end of re-execution, block 159, the user finds that the dish is not yet cooked.

He decides on an adjustment AJ by programming an additional time of 10′, block 163, then 107 and 108 of FIG. 9. At the end of this time of 10′, blocks 108 to 125, he judges that the dish is cooked but requires broiling the surface. He presses the key t3, block 128, with return to 103. He notices his error two minutes later because the preset temperature $\theta 3$ of operation in TURBO-BROIL mode displayed is only 190° C., blocks 112, 123–125, 128. He then changes again the function, blocks 123–125, 128, and presses T6, function F6, ECONOMY BROIL, block 103, operating at $\theta 7 = 300°$ C., block 104. After 7′, block 107, he judges that broiling is satisfactory, blocks 103 to 107 and 109 to 117. He presses the STOP key, block 117.

The learning memory MA totals:
PULSATING AIR: 180°, 80'
ECONOMY BROIL: 300°, 7'.

It did not take into account the TURBO BROIL operation because it lasted less than five minutes.

As a result of the automatic re-execution of the recipe No. 12, occupying the No. 12 position in the memory, there has been a learning step for adapting the recorded cooking or recipe to the number of guests and to personalize it according to the taste of the user.

The memory has selected only the steps of a time of more than five minutes.

The user eats the gratin and finds it good. He decides to erase the earlier recipe No. 5, which does not suit him, and records the new parameters in the memory position, that is in register No. 5, in two stages, as in the previous example.

In order to succeed again with potatoes au gratin broiled to his taste for five persons, it will simply be sufficient for the user to select the register No. 5 by a manual operation designated SR and to press the GO key.

EXAMPLE 4

Recall of a recipe or memory cooking

Figure 12:
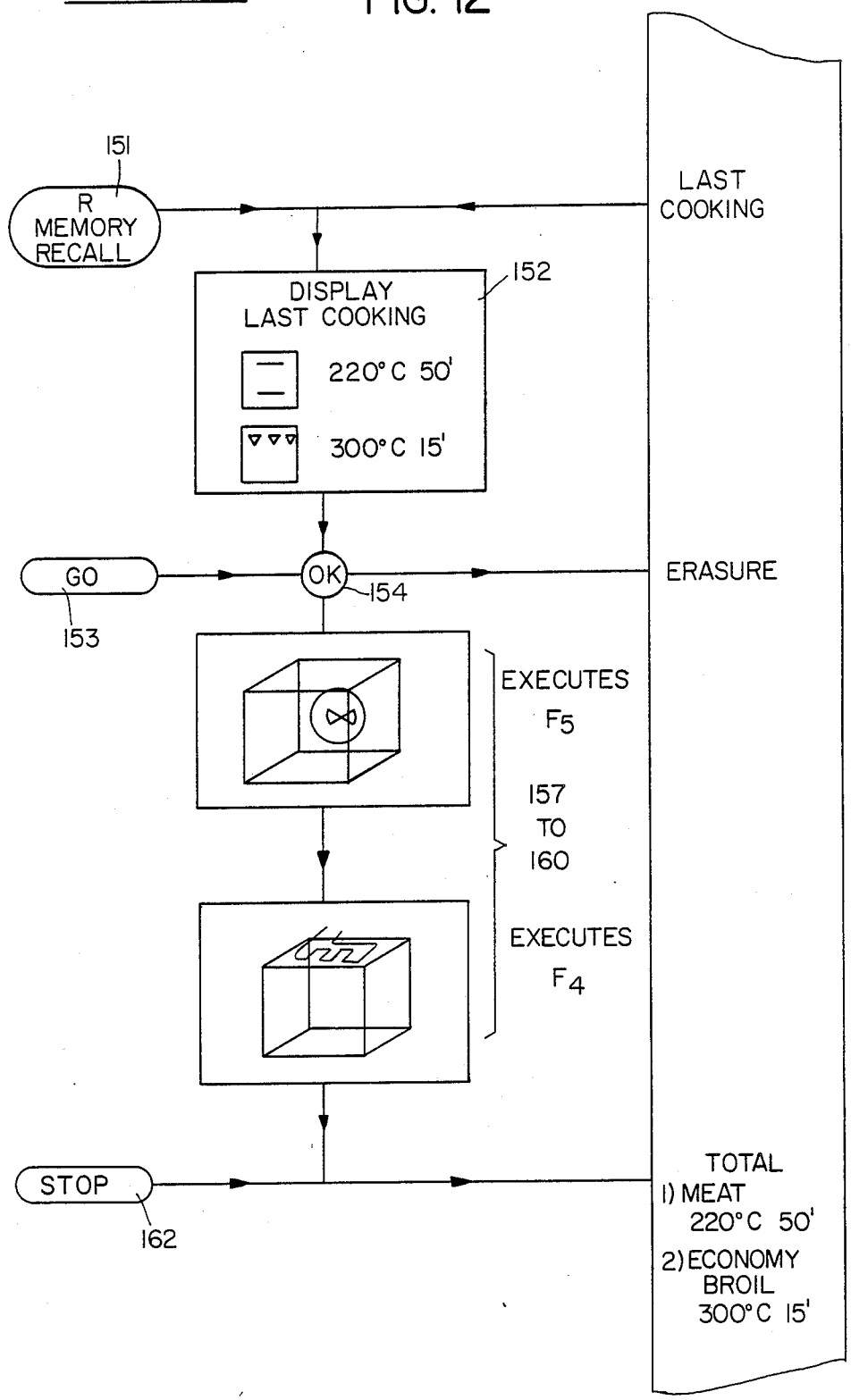
FIG. 12 is a chart analogous to that of FIG. 7 in the case of a recall of the last cooking operation.
Figure 13:
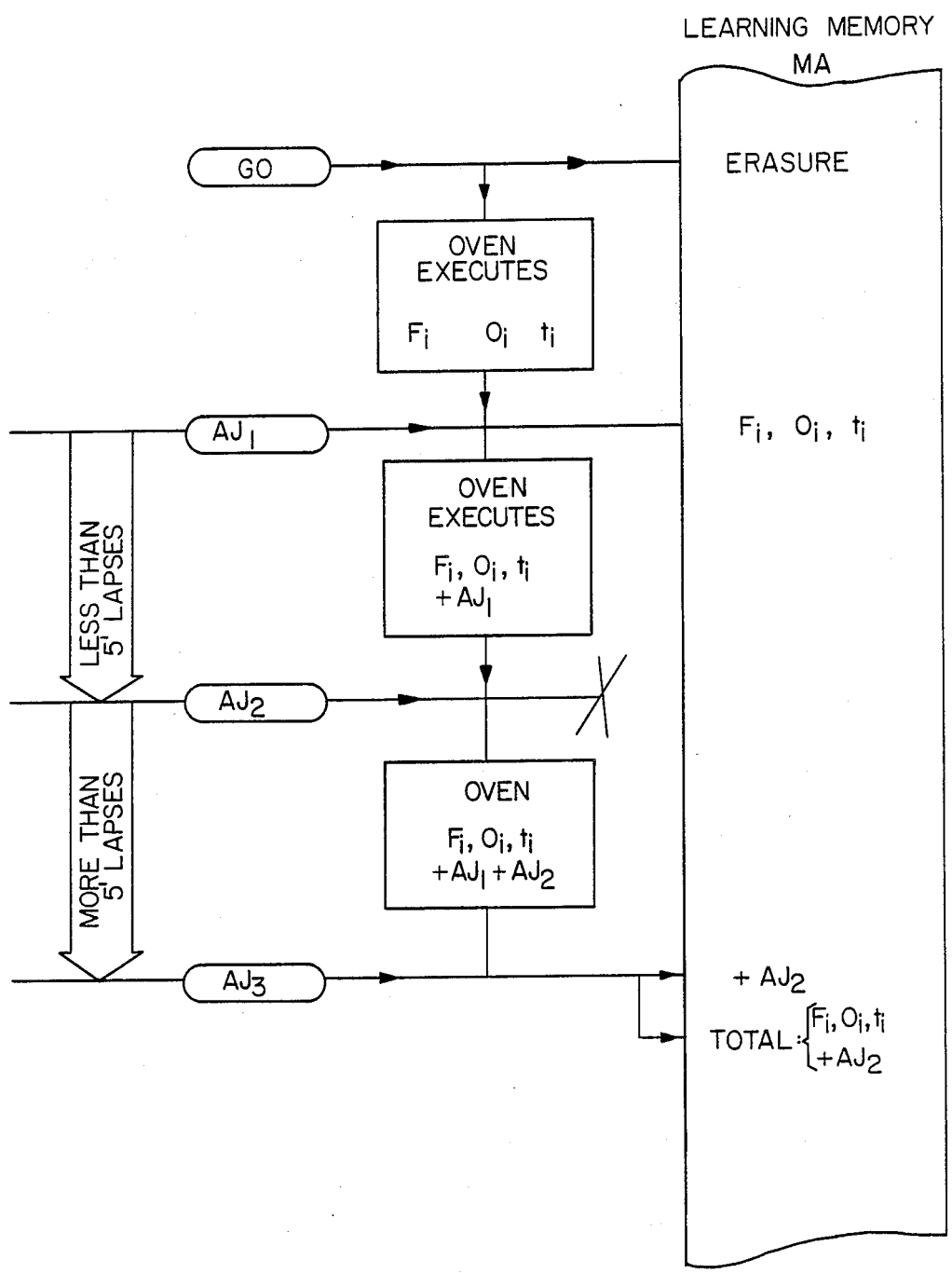
FIG. 13 is a simplified schematic diagram illustrating the role of the learning memory in the case of two instructions, distant and close.

The start is carried out with the parameters of the last cooking (FIGS. 11 and 12).

The user wants to cook a chicken. He does not have time to watch the cooking and does not have at his disposal a recorded recipe for this dish or wants to start again a learning cooking without trial and error.

The last cooking executed was then cooking of a chicken.

In order to avoid supervision and all the various manual actions, he decides to start again the last cooking.

He presses the R key (memory recall), or the last cooking, and the parameters of the last cooking stored in the learning memory MA are displayed.

When GO is pressed, the oven re-executes the last cooking.

One will now examine the block diagram of FIG. 14, which illustrates the automatic loading into the permanent EEPROM memory of the parameters of a cooking in progress at the time of an unforeseen or voluntary stopping of the cooking in progress.

Reference numbers starting with the number 200 will be chosen for the blocks.

In the course of the execution of a cooking, block 200, a stop occurs, block 201; the microprocessor immediately verifies the origin of the stop, block 202.

One deals either with a stop resulting from the action of the user on the STOP key, and the OK dial goes out, block 203, or with a defect of the oven power supply or a failure of the city electrical power distribution network.

The microprocessor searches for the block 204, and the contents of the learning memory 204 are loaded into the EEPROM memory to preserve them, block 205. Check of the oven power supply conditions or of the presence of the network voltage follows, block 206.

If the power failure persists, the microprocessor continues to check the power supply until its reserve of electrical power supply is exhausted, or until voltage is restored.

When the power returns, it transfers the parameters of the cooking in progress from the permanent memory to the learning memory MA, block 207, to restart the cooking at the stage at which it was stopped, 208-210.

We claim:

1. Electronic control for an electric home cooking oven comprising a cooking chamber with multiple cooking resistors, comprising base, chamber top, and turbine resistors, capable of being used in combination, characterized by the fact that it comprises:

power supply means for supplying electrical power to said resistors;

a microprocessor for managing the actions of the user on the keys and automatically controlling the application of voltage to the cooking resistors, a control panel serving as keyboard for the microprocessor comprising keys and light dials of indicators of operation of each key, a display, a GO key and a STOP key, as well as an operation dial indicating the application of voltage to the cooking resistors, the control panel comprising a separate keyboard of memory keys, a working memory being part of the microprocessor for storing the work parameters and using them as the cooking progresses, a learning memory contained in the microprocessor for storing all the parameters of an experimental cooking as it is being executed, a permanent EEPROM memory with several memory positions for selectively storing on command of the user or automatically during a stop in the course of cooking the parameters contained at a given moment in the learning memory.

2. Electronic control for an electric home oven defined in claim 1, wherein the permanent memory is outside the microprocessor.

3. Electronic control for an electric home oven defined in claims 1 and 2, wherein the learning memory of the microprocessor stores all the parameters of an experimental cooking as it is being executed, with the exclusion of the parameters corresponding to the errors of the user.

4. Electronic control for an electric home oven defined in claim 1, wherein if two consecutive modifications occur within a time interval of less than a predetermined value, said electronic control comprises means for ignoring the first modification in the learning memory.

5. Electronic control for an electric home oven defined in claim 4, wherein the time interval between two consecutive modifications is equal to five minutes.

6. Electronic control defined in claim 1, wherein:

the GO key controls the erasure of the learning memory, said learning memory containing solely the parameters of only one cooking;

a recording key controls the loading into the permanent memory of the parameters of the only cooking contained in the learning memory;

a recall key of the learning memory makes it possible to transfer the parameters of the only cooking of the learning memory to the control microprocessor for the operations of the oven.

7. A method for controlling an electric home oven having a control panel connected to a learning memory contained within the memory of a microprocessor and a permanent EEPROM type memory, comprising the steps of:

loading into the learning memory the cooking parameters manually selected by the user to start the learning cooking, selectively loading into the learning memory the adjustments and modifications performed by the user after starting the cooking, totaling in the learning memory the parameters resulting from the previous steps, to form the parameters of a recorded cooking, called RECIPE, selectively recording in the permanent memory the parameters totaled in the learning memory.

8. A method of controlling an electric home oven according to the method of claim 7, comprising the step of:

automatically loading the parameters from the learning memory into the permanent EEPROM memory in the event of power failure with interruption of a cooking, automatically reloading the previous parameters into the learning memory as soon as the power failure is repaired, restarting the oven with the parameters reloaded into the learning memory and allowing the cooking to continue from the stage at which it had stopped.

9. A method of controlling an electric home oven, according to claim 8 wherein every adjustment action following another action within a time interval greater than a predetermined value causes an automatic transfer of the previous values of the parameters into the working memory.

10. A method of controlling an electric home oven, according to claim 8 wherein every action on any one key places in the learning memory the parameters of the step which precedes the action.

11. A method of controlling an electric home oven, according to claim 8 wherein one causes the erasure of the learning memory by acting on the GO key, if a cooking is not in the course of execution.

12. A method of controlling an electric home oven, according to claim 8 wherein the learning memory can contain solely the parameters of only one cooking at one time.

13. A method of controlling an electric home oven having a control panel connected to a learning memory in the memory of a microprocessor and a permanent EEPROM memory comprising the steps of:

selecting a recipe recorded in the permanent EEPROM memory to command the oven to automatically re-execute a new cooking according to the parameters of the recorded cooking, adjusting one or several parameters of the new cooking while it is following its course or after it has completed its course, selectively memorizing in the learning memory the adjustments which have occurred previously, totaling in the learning memory the parameters of the recipe and the adjustments, without taking into account a modification followed by another one within a predetermined time interval.

* * * * *